Oct. 28, 1952     P. C. PALMER ET AL     2,615,647
FISHING LINE REEL
Filed Jan. 15, 1949     2 SHEETS—SHEET 2
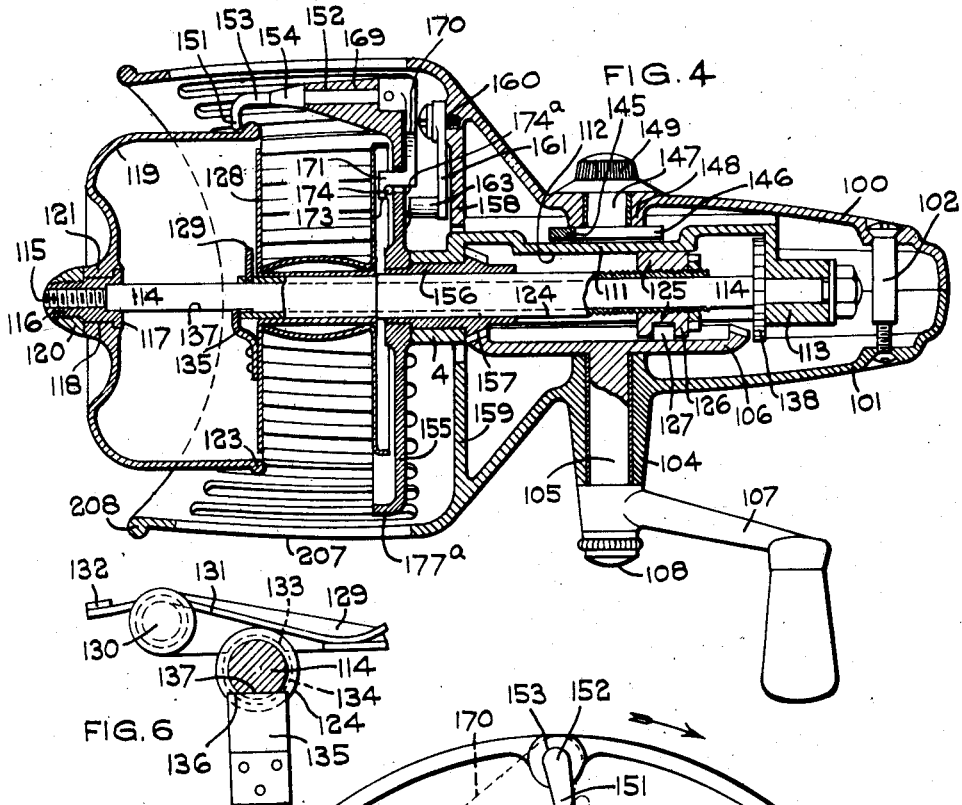
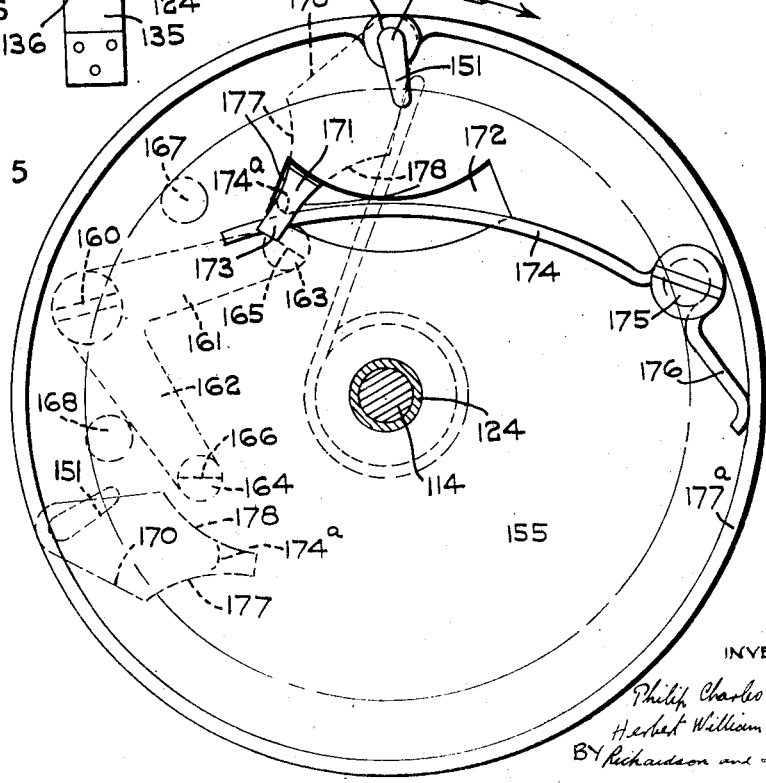

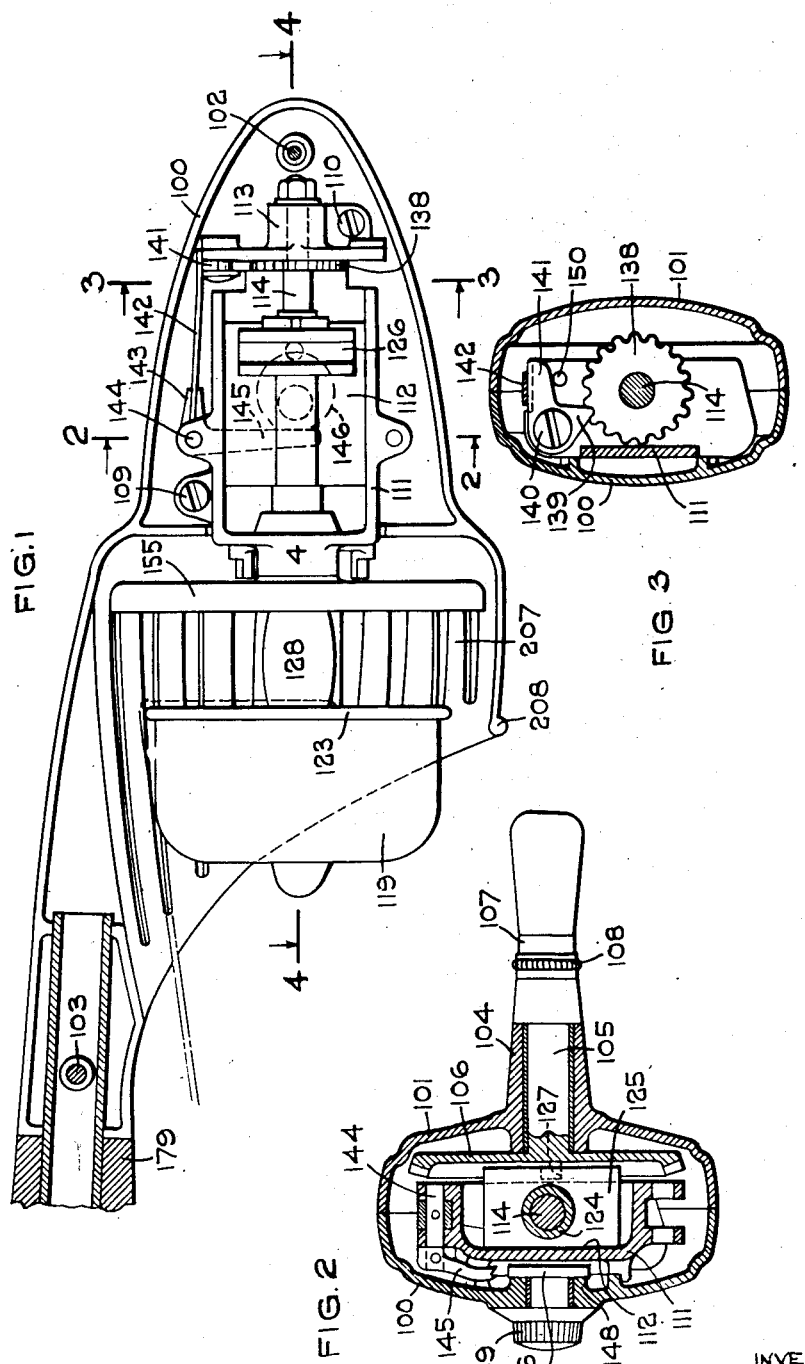

Patented Oct. 28, 1952

2,615,647

UNITED STATES PATENT OFFICE 2,615,647

FISHING LINE REEL

Philip Charles Palmer, Alvechurch, and Herbert William James, Redditch, England; said James assignor to said Palmer Application January 15, 1949, Serial No. 71,182
In Great Britain January 21, 1948

4 Claims. (Cl. 242—84.4)

This invention relates to fishing line reels used with fly fishing reels, and has for its object to provide certain improvements in fishing line reels of the kind wherein the axis of the reel is approximately parallel to the length of the rod.

The primary object of the invention is to provide a reel enabling the line to be wound-in without twisting it.

A further object of the present invention is to provide a fishing reel construction which can be produced and assembled at a low cost and which will be light in weight and easily handled.

The invention is illustrated in the accompanying drawings, wherein:

Figure 1 is a view in side elevation, partly in section, on the centre line and with one moulding or casting and the parts carried thereby removed.

Figure 2 is a section on line 2—2 of Figure 1.

Figure 3 is a section on line 3—3 of Figure 1.

Figure 4 is a section on line 4—4 of Figure 1.

Figure 5 is an end view upon an enlarged scale showing the means for operating the line pick-up arm by a backward movement of the driving spindle.

Figure 6 is an end view partly in section and on an enlarged scale showing the means employed to retain the spool against axial movement relatively to the sleeve upon which it is mounted and the means employed to prevent the spool from rotating relatively to the spool spindle.

In the construction illustrated the reel comprises a hollow body made in two parts 100 and 101. These two parts are secured together by screws 102 and 103. The part 101 is provided with a boss 104 for the shank 105 of a bevel wheel 106. The shank 105 forms the drive shaft, and at its end it has a portion of non-circular section upon which a crank handle 107 is secured by a screw 108.

Within the body part 100 is secured by screws 109 and 110 a bracket 111 which incorporates a guide surface 112 and two spaced bearings 113, 4. Mounted in the bearing 113 is one end of the spool shaft 114. This spool shaft does not rotate under normal conditions but is capable of rotating when excessive line tension is encountered. The opposite end of this shaft 114 is provided with a reduced and threaded part 115 upon which is screwed a sleeve 116. This sleeve has a flange 117 at its rear end, and it is provided with a plain cylindrical bearing surface 118 on which is mounted a hollow rotatable cap 119. Screwing onto the exterior of the sleeve is a nut 120. The cap 119 is provided with a bearing portion 121 which can rotate on the bearing surface 118. The cap 119 is provided with a dome-like portion at its forward end and with a cylindrical portion 122 for the greater part of its length, terminating in an external flange 123 of approximately circular section.

Mounted to slide upon the shaft 114 is a sleeve 124 upon which screws a collar 125 which engages the guide surface 112 so that the collar cannot rotate. The collar is provided with a groove 126 engaged by a pin 127 on the bevel wheel 106. The pin 127 is eccentric in relation to the axis of the shank 105 so that when the bevel wheel is rotated by turning the crank handle the sleeve 124 is reciprocated on the shaft 114.

At a position adjacent the open end of the cap 119 the spool 128 is mounted on the sleeve 124, this spool normally having no rotary movement but reciprocating with the sleeve. The forward flange of the spool is provided with a lever 129 (see Figures 4 and 6). This lever is pivoted to the flange of the spool at 130 and the lever is acted upon by a spring 131 one end of which engages a projection 132 on the spool flange and the opposite end of which engages the free end of the lever 129. The lever is provided with an arcuate recess 133 which engages in a peripheral slot 134 extending partly around the sleeve 124, thus ensuring that the spool reciprocates axially with the sleeve but permitting the spool to be removed from the sleeve when required.

Further, the flange 128 of the spool has fixed to it a bracket 135 one edge 136 of which engages a flat 137 on the spindle 114. This arrangement prevents any relative rotary movement between the spool and the spindle 114.

During normal operation, neither the spool nor the spindle 114 rotates, but provision may be made to allow them to rotate against a check device when excessive line tension is encountered. The check device incorporates a toothed wheel 138 fixed on the spindle 114, the teeth of this wheel being engaged by a pawl 139 pivoted at 140 to the bracket 111. The pawl is provided with an arm 141 which is acted upon by a spring 142 (see Figures 1 and 3). The spring 142 is mounted in an arm 143 of a two-armed lever pivoted at 144 to the bracket 111. The second arm 145 of this lever is acted upon by a cam or eccentric 146 mounted on a pin 147 extending through a boss 148 on the body member 100. The pin 147 is provided with a knurled head 149 to enable it to be turned to vary the pressure of the spring 142.

It should be observed that the arm 141 of the pawl engages a stop 150 mounted on the bracket 111 so that, as seen in Figure 3, the pawl 139 can move around the axis of the screw 140 in an anticlockwise direction only, and consequently this possible rotary movement of the spool and spindle 114 can take place in one direction only and it only occurs when line tension is excessive.

In this construction the line is wound on the spool by a line pick-up which rotates around the spool. This line pick-up is shown at 151 and consists of a straight arm which engages the line at one side only. When in the winding position the pick-up arm is approximately radial to the axis of the spool, but the pick-up arm is pivoted at 152 and means are provided whereby it may be turned through a sufficient angle to bring it away from the line so that the line is free for making a cast. The pick-up arm 151 is formed by the end of a pin 153 on which is a flange 154. The pin 153 is mounted parallel to the axis of the spool in a lug 163 projecting from one side of the rotary disc 155. This rotary disc at its centre is provided with a sleeve-like portion 156 which can rotate in the bearing 4 and on the sleeve 124. In the drawings the disc and sleeve-like portion 156 and the lug 163 are shown as being formed integrally, but obviously they may be made in two or more separate parts connected together. The sleeve-like portion 156 engages one end of the bracket 111, and it is further provided with a bevel pinion 157 which is engaged and driven by the bevel wheel 106.

Means are provided for moving the line pick-up arm 151 from the winding position shown in Figures 4 and 5 to a position in which it is clear of the line. This is done by turning the pin 153 through a suitable angle, such for instance as a right angle, and in the arrangement illustrated this can be done by turning the crank handle 107 in the reverse direction from the winding direction.

The body members 100 and 101 are provided with inwardly-projecting webs 158, 159, and pivotally mounted at 160 on the web 158 is a two-armed trip lever, the lever having arms 161 and 162. This lever can be seen in Figures 4 and 5, the lever being shown in dotted lines in Figure 5 as it is behind the disc 155. The two lever arms 161 and 162 are each provided with an axially-projecting cylindrical portion, these portions being shown at 163, 164, and at the end each of these portions is cut away to provide flat surfaces 165, 166. Mounted on the web 158 are two stop pins 167, 168, and the lever can oscillate between these pins. The two-armed trip lever may be replaced by a quadrant.

The pin 153 extends through the lug 163 and has mounted on its end a lever 170. This lever has its main portion disposed to the rear side of the disc 155, and has a portion 171 disposed parallel to the axis, which portion 171 extends through an arcuate slot 172 in the disc. The portion 171 terminates in a radially-disposed portion 173. The lever is acted upon by a spring 174 secured by a screw 175 to the disc, the spring having an arm 176 which bears upon the portion 177a of the disc. The main arm of the spring is of curved form, as shown, and presses against the part 171 of the lever 170.

Referring to Figure 5, the lever 170 can move from the position shown around the axis of the pin 153 in an anticlockwise direction until the part 171 has moved to the opposite end of the slot 172, and the spring 174 operates to retain the lever 170 in either terminal position, it being necessary for the part 171 to bend the spring when moving from one end of the slot to the other.

The line pick-up arm can be moved from the winding position to a position in which it is clear of the line by giving the crank handle 107 a backward turn. The winding direction is shown by the arrow in Figure 5, and during normal winding the end portion 171 of the lever arm 170 rides past the projections 164 and 163 in succession, causing an idle oscillation of the lever 161, 162 once for every revolution of the spool. If the disc is turned in the opposite direction the inner side of the part 171 comes into contact with the face 166 of the lever arm 162, and continued movement of the disc in the reverse direction causes the lever 170 to move through an angle which is approximately a right angle. When this occurs the part 171 of the lever moves to the righthand end of the slot 172, and the line pick-up arm moves away from the line. During the reverse movement of the lever 170 the end portion 171 of the lever 170 moves past the projection 163, but the face 174a eventually comes into contact with the face 163, with the result that the lever 170 is turned about the axis 152 and the pick-up arm 151 is moved clear of the line. Continued movement of the disc in the reverse direction brings the inclined surface 177 and the lever 170 into contact with the edge of the face 166 and thus rocks the lever 161, 162 until the arm 161 engages the stop 167. Sufficient friction is provided between the lever 161, 162 and its pivot 160 to cause the lever to retain any position into which it is moved. The pick-up arm 151 has now been moved clear of the line and further movement of the pick-up arm is not required again until it is necessary to wind in the line. When this occurs the disc 155 is turned in the direction of the arrow, as shown in Figure 5, until the surface 174a of the lever 170 comes into contact with the face 165. The reaction between these two parts moves the lever 170 back into the position shown in Figure 5, thus moving the pick-up arm 151 into the line-engaging position. Continued winding movement brings the curved inclined surface 178 against the edge of the face 165 and rocks the lever 161, 162 back into the position shown in dotted lines in Figure 5.

What we claim then is:

1. A fishing line reel comprising a body, a driving spindle adapted to be turned by hand, a normally stationary spool spindle, a spool on said spool spindle having flanges at its ends, said spool being adapted to have a line wound thereon and being mounted on the spool spindle for axial reciprocation without rotation, a cap of hollow cup-like form mounted concentrically with the spool and having its open end disposed adjacent the forward flange of the spool, said cap having a circular rim adjacent the spool and of larger diameter than that of the spool flange at the end nearest the cap, said rim forming a guide for the line as it leaves the spool or is wound thereon, a line pick-up consisting of an element adapted to engage the line at one side only, said pick-up element being movable into and out of line-engaging position, a carrier disc rotatably mounted on said spool spindle, transmission means connecting the driving spindle with said carrier disc, said pick-up element comprising an arm on a pivot extending through said carrier disc and disposed on an axis parallel to the axis of the spool, a pick-up actuating lever on said pivot extending partly across one face of the carrier disc, a trip lever pivoted to the body and having spaced projections for engagement by the end of said pick-up actuating lever as the carrier disc rotates, stops on the body cooperating with said trip lever to limit its pivotal movement, said trip lever moving said pick-up actuating lever and the pick-up arm when the carrier disc is rotated in the direction reverse to the winding direction, and means driven by the driving spindle for reciprocating the spool.

2. A fishing line reel according to claim 1 including a sleeve on the spool spindle, the carrier being in the form of a disc mounted on said sleeve, said disc having a slot, said pick-up actuating lever having a portion projecting into said slot, and the reverse movement of the driving spindle being limited by engagement between the said portion of the pick-up actuating lever and one end of the slot.

3. A fishing line reel according to claim 1, having cam surfaces upon said pick-up actuating lever for engaging said projections so that on reverse movement followed by winding movement of the driving spindle the pick-up actuating lever engages one of the trip lever projections and rocks the trip lever so as to bring the other of its projections into the path of movement of said pick-up actuating lever so that said pick-up lever is rocked to bring the pick-up arm into its line-engaging position again, and simultaneously the pick-up actuating lever again rocks the trip lever back into its original position.

4. A fishing line reel comprising a body upon which is mounted a driving spindle adapted to be turned by hand, a bracket fixed in the body, said bracket having two spaced bearings and a guide surface disposed between them, a spool spindle engaging in one bearing and extending through the other bearing, a sleeve on said spool spindle, a collar fixed on said sleeve and engaging said guide surface, a bevel wheel on the driving spindle, an eccentrically-mounted driving pin on said bevel wheel, said pin engaging said collar, a disc having at its center a sleeve-like portion mounted on said sleeve and engaging one of the bearings on the bracket, said sleeve-like portion having bevel teeth engaged by the teeth of said bevel wheel, a spool for the fishing line mounted on said sleeve, said spool spindle having a flat surface, means on the spool engaging the flat surface, a cap rotatably mounted on said spool spindle, said cap being of open-ended cup-like form with its open end disposed adjacent one end of the spool, a line pick-up element pivotally mounted in the disc, and means for moving the pick-up element into and out of line-engaging position, said pick-up element comprising an arm on a pivot extending through said disc and disposed on an axis parallel to the axis of the spool, a pick-up actuating lever on said pivot extending partly across one face of the disc, a trip lever pivoted to the body and having spaced projections for engagement by the end of said pick-up actuating lever as the disc rotates, stops on the body co-operating with said trip lever to limit its pivotal movement, said trip lever moving said pick-up actuating lever and the pick-up arm so that the latter is clear of the line when the disc is turned in the direction reverse to the winding-in direction.

PHILIP CHARLES PALMER.
HERBERT WILLIAM JAMES.

REFERENCES CITED

The following references are of record in the file of this patent:

UNITED STATES PATENTS

| Number | Name | Date |
|---|---|---|
| 2,179,413 | Kolosso | Nov. 7, 1939 |
| 2,229,470 | Pezon | Jan. 21, 1941 |

FOREIGN PATENTS

| Number | Country | Date |
|---|---|---|
| 22,597 | Great Britain | of 1907 |
| 909,825 | France | Jan. 7, 1946 |